US012754354B2

(12) United States Patent
Yamagishi

(10) Patent No.: US 12,754,354 B2
(45) Date of Patent: Oct. 6, 2026

(54) OPTICAL COMPUTING DEVICE AND METHOD FOR MANUFACTURING OPTICAL COMPUTING DEVICE

(71) Applicant: FUJIKURA LTD., Tokyo (JP)

(72) Inventor: Hiroyuki Yamagishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 349 days.

(21) Appl. No.: 18/256,211

(22) PCT Filed: Aug. 2, 2021

(86) PCT No.: PCT/JP2021/028551
§ 371 (c)(1),
(2) Date: Jun. 7, 2023

(87) PCT Pub. No.: WO2022/130679
PCT Pub. Date: Jun. 23, 2022

(65) Prior Publication Data
US 2024/0019615 A1 Jan. 18, 2024

(30) Foreign Application Priority Data
Dec. 16, 2020 (JP) ................................ 2020-208661

(51) Int. Cl.
*G02B 5/18* (2006.01)

(52) U.S. Cl.
CPC ..................................... *G02B 5/18* (2013.01)

(58) Field of Classification Search
CPC ................................. G02B 5/18; G02B 27/42
USPC .......................................................... 359/558
See application file for complete search history.

(56) References Cited

U.S. PATENT DOCUMENTS

2016/0349517 A1* 12/2016 Miyasaka ............ G02B 5/3016
2021/0142170 A1* 5/2021 Ozcan ................ G02B 27/4205
2021/0271000 A1* 9/2021 Park ..................... G02B 5/1871
2022/0327371 A1* 10/2022 Ozcan ................ G02B 27/4277

FOREIGN PATENT DOCUMENTS

JP 200368604 A 3/2003
JP 200685071 A 3/2006
JP 2018-527829 A 9/2018
JP 2018-163353 A 10/2018

OTHER PUBLICATIONS

Written Opinion issued in counterpart International Application No. PCT/JP2021/028551, dated Oct. 19, 2021 (8 pages).
International Search Report issued in International Application No. PCT/JP2021/028551, dated Oct. 19, 2021 (2 pages).

* cited by examiner

*Primary Examiner* — Stephone B Allen
*Assistant Examiner* — Boutsikaris Leonidas
(74) *Attorney, Agent, or Firm* — Osha Bergman Watanabe & Burton LLP

(57) ABSTRACT

An optical computing device includes a substrate and planar light diffraction elements. Each of the planar light diffraction elements is fixed to the substrate and includes microcells that have respective thicknesses or refractive indices set independently.

4 Claims, 4 Drawing Sheets

OPTICAL COMPUTING DEVICE AND METHOD FOR MANUFACTURING OPTICAL COMPUTING DEVICE

BACKGROUND

Technical Field

The present invention relates to an optical computing device including a plurality of planar light diffraction elements. The present invention also relates to a method for manufacturing such an optical computing device.

Description of the Related Art

Patent Literature 1 discloses a technique for fixing, to a corresponding tubular holder (specifically, lens holder), each of a plurality of optical elements (specifically, lenses) that are arranged side by side.

PATENT LITERATURE

Patent Literature 1: PCT International Application Publication No. 2018-527829

A planar light diffraction element that includes a plurality of microcells each of which has an individually set thickness or refractive index is known as an optical element that has an optical computing function. Use of an optical computing device in which such planar light diffraction elements are arranged on an optical path of signal light makes it possible to carry out complex optical computing at a high speed with low electric power consumption. However, use of the technique disclosed in Patent Literature 1 to fix, to a corresponding tubular holder, each of a plurality of planar light diffraction elements constituting an optical computing device causes the following.

Specifically, a change in ambient temperature causes strain in a holder by thermal expansion or thermal contraction. Each of the planar light diffraction elements is fixed to an inner surface of a corresponding holder over the entire circumference of the holder. Thus, in a case where strain occurs in the holder, strain or stress inevitably occurs in each of the planar light diffraction elements. Occurrence of strain or stress in a planar light diffraction element makes it difficult or impossible for the planar light diffraction element to carry out desired computing. This consequently makes it difficult or impossible for these planar light diffraction elements as a whole to carry out desired computing.

SUMMARY

One or more embodiments provide an optical computing device that easily maintains a computing function even in a case where ambient temperature changes.

An optical computing device in accordance with one or more embodiments includes: a substrate; and a light diffraction element group including a plurality of planar light diffraction elements, each planar light diffraction element belonging to the light diffraction element group (i) being constituted by a plurality of microcells that have respective thicknesses or refractive indices set independently of each other and (ii) being fixed to the substrate.

A method for manufacturing an optical computing device in accordance with one or more embodiments is a method for manufacturing an optical computing device recited above, including the step of collectively forming planar light diffraction elements belonging to the light diffraction element group.

One or more embodiments can provide an optical computing device that easily maintains a computing function even in a case where ambient temperature changes.

DESCRIPTION OF THE EMBODIMENTS

Example 1

(Configuration of Optical Computing Device)

Figure 1:
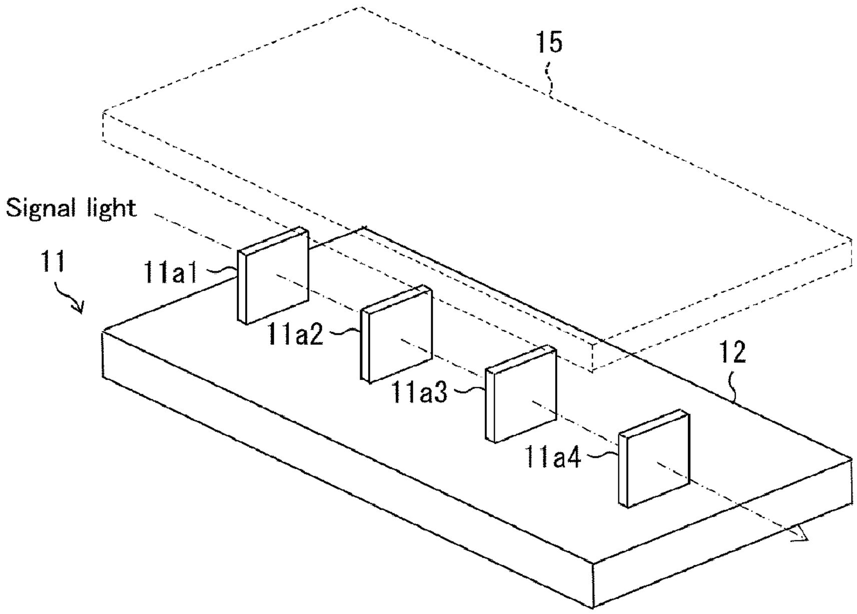
FIG. 1 is a perspective view illustrating a configuration of an optical computing device in accordance with Example 1.

The following description will discuss, with reference to FIG. 1, a configuration of an optical computing device 1 in accordance with Example 1. FIG. 1 is a perspective view illustrating a configuration of the optical computing device 1.

The optical computing device 1 includes a light diffraction element group 11 and a substrate 12. The light diffraction element group 11 is constituted by a plurality of (four in Example 1) planar light diffraction elements 11*a*1 to 11*a*4. Example 1 uses, as the planar light diffraction elements 11*a*1 to 11*a*4, plate-like members each of which is made of a resin and has a square shape in a plan view. Furthermore, Example 1 uses, as the substrate 12, a plate-like member that is made of glass and has a rectangular shape in a plan view.

Each of the planar light diffraction elements 11*a*1 to 11*a*4 has an end surface which is directly fixed to a main surface of the substrate 12 so that an entrance surface thereof and an exit surface thereof intersect (in Example 1, are orthogonal to) the main surface of the substrate 12.

Each of planar light diffraction elements 11*ai* (i=1, 2, . . . , 4) is constituted by a plurality of microcells that have respective thicknesses or refractive indices set independently of each other. Upon entry of signal light into the optical computing device 1, signal light beams that have passed through the respective microcells and that have different phases mutually interfere with each other, so that predetermined optical computing is carried out. Note that the term "microcell" herein refers to, for example, a cell having a cell size of less than 10 μm. Note also that the term "cell size" herein refers to a square root of an area of a cell. For example, in a case where a microcell has a square shape in a plan view, the cell size is a length of one side of the cell. The cell size has a lower limit that is not particularly limited but can be, for example, 1 nm.

In Example 1, the planar light diffraction elements 11*a*1 to 11*a*4 are arranged side by side in a straight line on an optical path of signal light that is input to the optical computing device 1. Thus, the signal light that has been input to the optical computing device 1 passes through the first planar light diffraction element 11*a*1, the second planar light diffraction element 11*a*2, the third planar light diffraction element 11*a*3, and the fourth planar light diffraction element 11*a*4 in this order. As such, in the optical computing device 1, first optical computing by the first planar light diffraction element 11*a*1, second optical computing by the second planar light diffraction element 11*a*2, third optical computing by the third planar light diffraction element 11*a*3, and fourth optical computing by the fourth planar light diffraction element 11*a*4 are carried out in this order.

The optical computing device 1 may include a plate-like cover 15 (indicated by the dotted lines in FIG. 1) that is provided so as to face the substrate 12. For example, the cover 15 is supported by at least three supporting columns (not illustrated in FIG. 1) each of which has one end fixed to an upper surface of the substrate 12 and the other end fixed to a lower surface of the cover 15. Alternatively, the cover 15 is supported by side walls (not illustrated in FIG. 1) each of which has one end fixed to the upper surface of the substrate 12 and the other end fixed to the lower surface of the cover 15 and which surround the light diffraction element group 11 from four sides. The supporting columns or the side walls are set high enough for the lower surface of the cover 15 to be in non-contact with an upper end surface of each of the planar light diffraction elements 11*ai*.

Note here that the upper surface of the substrate 12 refers to one of two main surfaces of the substrate 12 to which one the planar light diffraction elements 11*a*1 to 11*a*4 are fixed. Note also that the lower surface of the cover 15 refers to one of two main surfaces of the cover 15 which one faces a corresponding one of the main surfaces of the substrate 12. Note also that an upper end surface of a planar light diffraction element 11*ai* refers to one of four end surfaces of the planar light diffraction element 11*ai* which one faces the end surface that is fixed to the upper surface of the substrate 12. In a case where a configuration is employed in which the cover 15 is supported by the side walls, a liquid such as matching oil or a gas such as nitrogen gas can be enclosed in a space surrounded by the substrate 12, the cover 15, and the side walls.

(Specific Example of Planar Light Diffraction Element)

Figure 2:
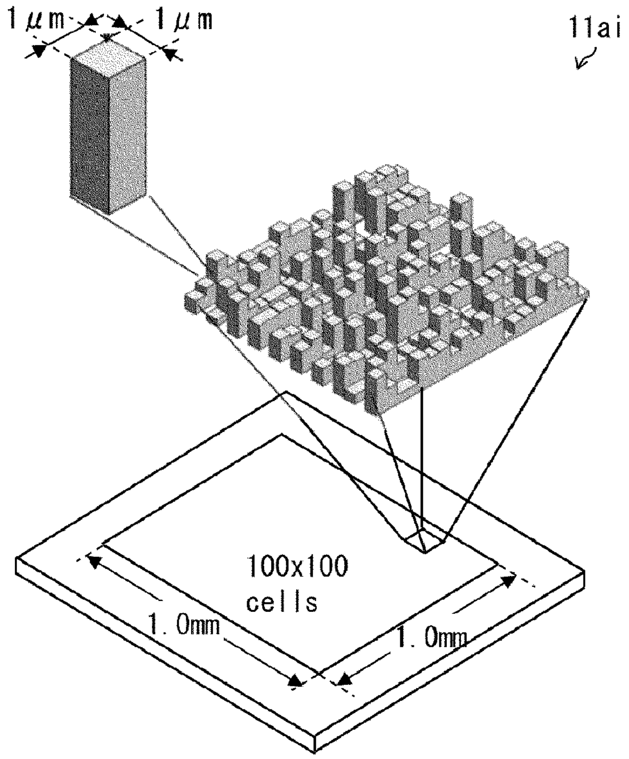
FIG. 2 is a perspective view illustrating a specific example of a planar light diffraction element of the optical computing device illustrated in FIG. 1.

The following description will discuss, with reference to FIG. 2, a specific example of each of the planar light diffraction elements 11*ai* of the optical computing device 1. FIG. 2 is a perspective view of a planar light diffraction element 11*ai* in accordance with the present specific example.

The planar light diffraction element 11*ai* in accordance with the present specific example has a 1.0 mm square effective region. The effective region is constituted by 100×100 microcells that are provided in a matrix pattern. The microcells are constituted by respective pillars each of which (i) is formed on a base having a thickness of 100 μm, (ii) has a 1 μm square bottom surface, and (iii) has a quadrangular prism shape. Each of the pillars has any of the following heights: 0 nm, 100 nm, 200 nm, . . . , 1100 nm, and 1200 nm (13 stages in 100 nm steps). The height of each of the pillars is determined so that a phase-change amount of light which passes through a microcell constituted by a corresponding pillar has a desired value.

In the planar light diffraction element 11*ai* in accordance with the present specific example, a pillar is provided on only one of main surfaces of the base. Note, however, that the present invention is not limited to this. Specifically, the pillar may be provided on each of both the main surfaces of the base. The planar light diffraction element 11*a*1 in which the pillar is provided on only one of the main surfaces of the base can be provided in the optical computing device 1 so that (i) the surface on which the pillar is provided serves as an entrance surface through which signal light enters the planar light diffraction element 11*a*1 or (ii) the surface on which the pillar is provided serves as an exit surface through which signal light exits from the planar light diffraction element 11*a*1. In contrast, the planar light diffraction element 11*a*1 in which the pillar is provided on each of both the main surfaces of the base can be provided in the optical computing device 1 so that (i) one of the surfaces on which the pillar is provided serves as the entrance surface through which signal light enters the planar light diffraction element 11*a*1 and (ii) the other of the surfaces on which the pillar is provided serves as the exit surface through which signal light exits from the planar light diffraction element 11*a*1.

In the planar light diffraction element 11*ai* in accordance with the present specific example, a thickness of each of the microcells (i.e., a height of a pillar constituting each of the microcells) is set so that a phase-change amount of light that passes through a corresponding microcell has a desired value. Note, however, that the present invention is not limited to this. For example, a refractive index of each of the microcells may be set so that a phase-change amount of light that passes through a corresponding microcell has a desired value. In this case, the refractive index of each of the microcells may be set by selecting a material of a corresponding microcell or by selecting a type and/or an amount of an additive to be added to the material of the corresponding microcell. Furthermore, in a case where the microcells are each made of a resin (polymer), a refractive index of a corresponding microcell may be set by controlling a degree of polymerization of the resin.

(Effect of Optical Computing Device)

As described above, the optical computing device 1 includes the substrate 12 and the light diffraction element group 11 including the plurality of planar light diffraction elements 11*a*1 to 11*a*4. Each of the planar light diffraction elements 11*ai* belonging to the light diffraction element group 11 is constituted by a plurality of microcells that have respective thicknesses or refractive indices set independently of each other, and is fixed to the substrate 12 so that an entrance surface thereof and an exit surface thereof intersect a main surface of the substrate 12.

Therefore, in the optical computing device 1, only a part (one end surface) of an outer periphery (four end surfaces) of each of the planar light diffraction elements 11*ai* is fixed to the substrate 12, and the remaining part (three end surfaces) of the outer periphery is free. Thus, such a configuration makes it less likely for strain or stress caused by a change in ambient temperature to occur in each of the planar light diffraction elements 11*ai*, as compared with a case where the technique disclosed in Patent Literature 1 is used to fix the entire outer periphery of each of the planar light diffraction elements 11*ai* to an inner surface of a tubular holder. This makes it possible to achieve the optical computing device 1 that easily maintains a computing function even in a case where ambient temperature changes.

The optical computing device 1 may further include the cover 15 that faces the substrate 12 and that is supported so as to be in non-contact with each of the planar light diffraction elements 11*ai* belonging to the light diffraction element group 11.

In this case, according to the optical computing device 1, it is possible to protect each of the planar light diffraction elements 11*ai* from, for example, shock and/or vibrations that may be applied to each of the planar light diffraction elements 11*ai* from outside the optical computing device 1. It is also possible to protect each of the planar light diffraction elements 11*ai* from a foreign matter that may fly to the optical computing device 1.

The light diffraction element group 11 may include a planar light diffraction element both surfaces of which are each provided with a plurality of pillars that have respective heights set independently of each other.

In a planar light diffraction element both surfaces of which are each provided with pillars, a cell that has a greater phase-change amount (i.e., a greater thickness) can be formed than in a planar light diffraction element one surface of which is provided with pillars. This allows optical computing that can be carried out by the planar light diffraction element both surfaces of which are each provided with pillars to have a higher degree of freedom than optical computing that can be carried out by the planar light diffraction element one surface of which is provided with pillars. Thus, the light diffraction element group 11 that includes the planar light diffraction element both surfaces of which are each provided with pillars makes it possible to increase the degree of freedom of optical computing that can be carried out by the optical computing device 1.

As a method for manufacturing the optical computing device 1, it is possible to employ a manufacturing method including the step of collectively forming the planar light diffraction elements 11*ai* belonging to the light diffraction element group 11.

Employment of such a manufacturing method makes it possible to omit an adjustment step which is necessary in a case where the planar light diffraction elements 11*ai* are separately formed and in which positions and orientations of the planar light diffraction elements 11*ai* are adjusted so as to achieve a desired relative positional relationship between the planar light diffraction elements 11*ai*. Thus, according to such a manufacturing method, a relative positional relationship between the planar light diffraction elements 11*ai* can be easily maintained as desired.

Note that the step of collectively forming the planar light diffraction elements 11*a*1 belonging to the light diffraction element group 11 can be carried out by, for example, a nanoimprinting method or a stereolithography method. The stereolithography method may also be referred to as a liquid-phase photopolymerization method.

Example 2

(Configuration of Optical Computing Device)

Figure 3:
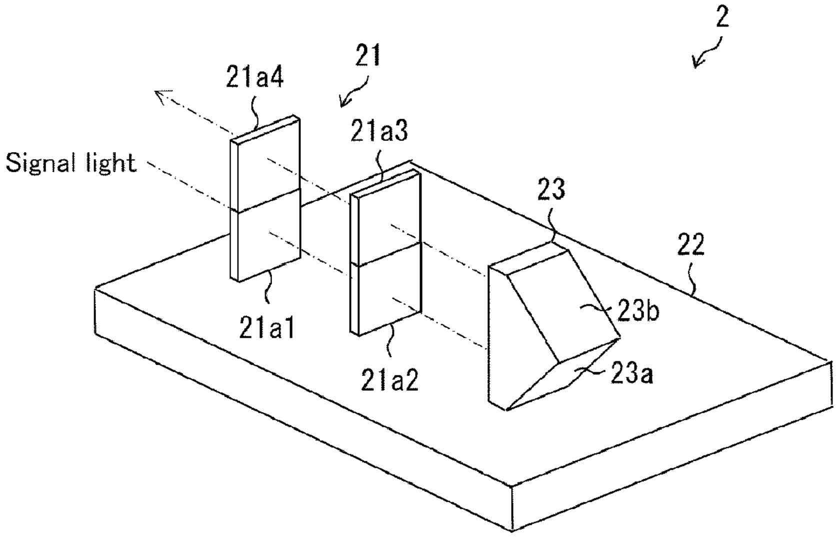
FIG. 3 is a perspective view illustrating a configuration of an optical computing device in accordance with Example 2.

The following description will discuss, with reference to FIG. 3, a configuration of an optical computing device 2 in accordance with Example 2. FIG. 3 is a perspective view illustrating a configuration of the optical computing device 2.

The optical computing device 2 includes a light diffraction element group 21, a substrate 22, and a prism 23. The light diffraction element group 21 is constituted by a plurality of (four in Example 2) planar light diffraction elements 21*a*1 to 21*a*4. Example 2 employs, as the planar light diffraction elements 21*a*1 to 21*a*4, plate-like members each of which is made of a resin and has a square shape in a plan view. Furthermore, Example 2 uses, as the substrate 22, a plate-like member that is made of glass and has a rectangular shape in a plan view. Moreover, Example 2 uses, as the prism 23, a rectangular prism having two reflecting surfaces 23*a* and 23*b* that are orthogonal to each other.

Each of the first planar light diffraction element 21*a*1 and the second planar light diffraction element 21*a*2 has an end surface which is directly fixed to a main surface of the substrate 22 so that an entrance surface thereof and an exit surface thereof intersect (in Example 2, are orthogonal to) the main surface of the substrate 22. The third planar light diffraction element 21*a*3 is indirectly fixed to the main surface of the substrate 22 via the second planar light diffraction element 21*a*2 so that an entrance surface thereof and an exit surface thereof intersect (in Example 2, are orthogonal to) the main surface of the substrate 22. The fourth planar light diffraction element 21*a*4 is indirectly fixed to the main surface of the substrate 22 via the first planar light diffraction element 21*a*1 so that an entrance surface thereof and an exit surface thereof intersect (in Example 2, are orthogonal to) the main surface of the substrate 22.

Each of planar light diffraction elements 21*ai* (i=1, 2, 3, 4) is constituted by a plurality of microcells that have respective thicknesses or refractive indices set independently of each other. Upon entry of signal light into the optical computing device 2, signal light beams that have passed through the respective microcells and that have different phases mutually interfere with each other, so that predetermined optical computing is carried out. Since a specific example of each of the planar light diffraction elements 21*ai* is similar to the specific example of each of the planar light diffraction elements 11*ai* of the optical computing device 1 in accordance with Example 1, a description thereof is omitted here.

In Example 2, the first planar light diffraction element 21*a*1 and the second planar light diffraction element 21*a*2 are arranged side by side in a straight line on an optical path of signal light that is input to the optical computing device 2. Thus, the signal light that has been input to the optical computing device 2 passes through the first planar light diffraction element 21*a*1 and the second planar light diffraction element 21*a*2 in this order. The first reflecting surface 23*a* of the prism 23 is provided on an optical path of the signal light that has passed through the second planar light diffraction element 21*a*2. The first reflecting surface 23*a* of the prism 23 reflects the signal light, which has passed through the second planar light diffraction element 21*a*2, so as to change a traveling direction of the signal light by 90° in a plane intersecting (in Example 2, orthogonal to) the main surface of the substrate 22. The second reflecting surface 23*b* of the prism 23 is provided on an optical path of the signal light that has been reflected by the first reflecting surface 23*a* of the prism 23. The second reflecting surface 23*b* of the prism 23 reflects the signal light, which has been reflected by the first reflecting surface 23*a* of the prism 23, so as to further change the traveling direction of the signal light by 90° in the plane intersecting (in Example 2, orthogonal to) the main surface of the substrate 22. That is, the prism 23 reflects, via the first reflecting surface 23*a* and the second reflecting surface 23*b*, the signal light, which has passed through the second planar light diffraction element 21*a*2, in a direction opposite from the traveling direction of the signal light. The third planar light diffraction element 21*a*3 and the fourth planar light diffraction element 21*a*4 are arranged side by side in a straight line on an optical path of the signal light that has been reflected by the second reflecting surface 23*b* of the prism 23. Thus, the signal light that has been reflected by the second reflecting surface 23*b* of the prism 23 passes through the third planar light diffraction element

21*a*3 and the fourth planar light diffraction element 21*a*4 in this order. As such, in the optical computing device 2, first optical computing by the first planar light diffraction element 21*a*1, second optical computing by the second planar light diffraction element 21*a*2, third optical computing by the third planar light diffraction element 21*a*3, and fourth optical computing by the fourth planar light diffraction element 21*a*4 are carried out in this order.

(Effect of Optical Computing Device)

As described above, the optical computing device 2 further includes the prism 23 that functions as an optical element which folds back an optical path of signal light in a plane intersecting the main surface of the substrate 22. The light diffraction element group 21 includes (i) the planar light diffraction elements 21*a*1 and 21*a*2 that are provided in the optical path which has not been folded back and that are directly fixed to the substrate 12, and (ii) the planar light diffraction elements 21*a*4 and 21*a*3 that are provided in the optical path which has been folded back and that are indirectly fixed to the substrate 22 via the planar light diffraction elements 21*a*1 and 21*a*2.

Thus, the optical computing device 2 makes it possible to increase a density at which the planar light diffraction elements 21*a*1, 21*a*2, 21*a*3, and 21*a*4 are to be mounted on the substrate 22. As such, the optical computing device 2 enables a further reduction in size of the substrate 22 as compared with the optical computing device 1.

Example 3

(Configuration of Optical Computing Device)

Figure 4:
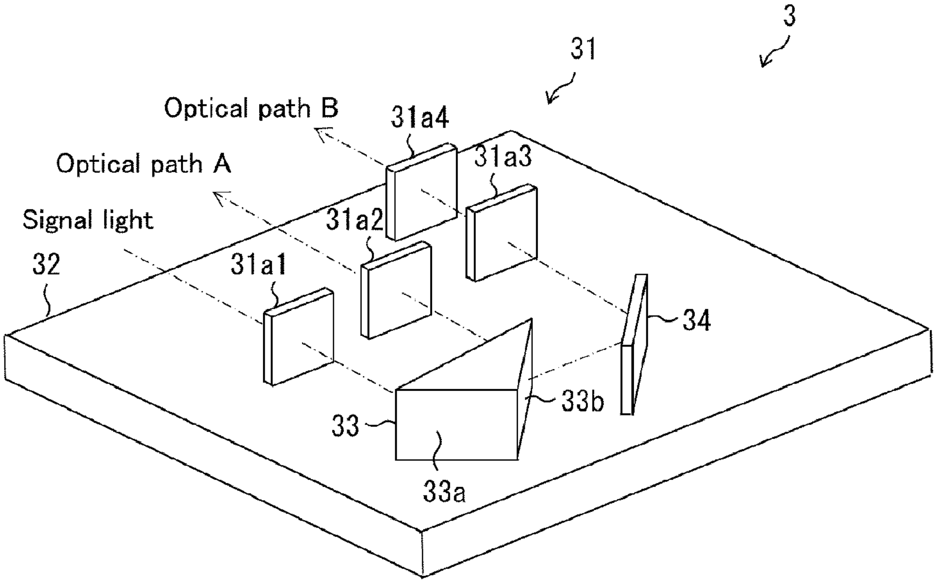
FIG. 4 is a perspective view illustrating a configuration of an optical computing device in accordance with Example 3.

The following description will discuss, with reference to FIG. 4, a configuration of an optical computing device 3 in accordance with Example 3. FIG. 4 is a perspective view illustrating a configuration of the optical computing device 3.

The optical computing device 3 includes a light diffraction element group 31, a substrate 32, a prism 33, and a mirror 34. The light diffraction element group 31 is constituted by a plurality of (four in Example 3) planar light diffraction elements 31*a*1 to 31*a*4. Example 3 employs, as the planar light diffraction elements 31*a*1 to 31*a*4, plate-like members each of which is made of a resin and has a square shape in a plan view. Furthermore, Example 3 uses, as the substrate 32, a plate-like member that is made of glass and has a rectangular shape in a plan view. Moreover, Example 3 uses, as the prism 33, a rectangular prism having two reflecting surfaces 33*a* and 33*b* that are orthogonal to each other.

Each of the planar light diffraction elements 31*a*1 to 31*a*4 has an end surface which is directly fixed to a main surface of the substrate 32 so that an entrance surface thereof and an exit surface thereof intersect (in Example 3, are orthogonal to) the main surface of the substrate 32.

Each of planar light diffraction elements 31*ai* (i=1, 2, 3, 4) is constituted by a plurality of microcells that have respective thicknesses or refractive indices set independently of each other. Upon entry of signal light into the optical computing device 3, signal light beams that have passed through the respective microcells and that have different phases mutually interfere with each other, so that predetermined optical computing is carried out. Since a specific example of each of the planar light diffraction elements 31*ai* is similar to the specific example of each of the planar light diffraction elements 11*ai* (i=1, 2, 3, 4) of the optical computing device 1 in accordance with Example 1, a description thereof is omitted here.

In Example 3, the first planar light diffraction element 31*a*1 is provided on an optical path of signal light that is input to the optical computing device 3. Thus, the signal light that has been input to the optical computing device 3 passes through the first planar light diffraction element 31*a*1. The first reflecting surface 33*a* of the prism 33 is provided on an optical path of the signal light that has passed through the first planar light diffraction element 31*a*1. The first reflecting surface 33*a* of the prism 33 reflects the signal light, which has passed through the first planar light diffraction element 31*a*1, so as to change a traveling direction of the signal light by 90° in a plane parallel to the main surface of the substrate 32. The second reflecting surface 33*b* of the prism 33 is provided on an optical path of the signal light that has been reflected by the first reflecting surface 33*a* of the prism 33. The second reflecting surface 33*b* of the prism 33 reflects a part of the signal light, which has been reflected by the first reflecting surface 33*a* of the prism 33, so as to further change the traveling direction of the part of the signal light by 90° in the plane parallel to the main surface of the substrate 32. Furthermore, the second reflecting surface 33*b* of the prism 33 causes another part of the signal light that has been reflected by the first reflecting surface 33*a* of the prism 33 to pass therethrough.

The second planar light diffraction element 31*a*2 is provided on an optical path of the signal light that has been reflected by the second reflecting surface 33*b* of the prism 33. Thus, the signal light that has been reflected by the second reflecting surface 33*b* of the prism 33 passes through the second planar light diffraction element 31*a*2. As such, in the optical computing device 3, first optical computing by the first planar light diffraction element 31*a*1 and second optical computing by the second planar light diffraction element 31*a*2 are carried out in this order.

The mirror 34 is provided on an optical path of the signal light that has passed through the second reflecting surface 33*b* of the prism 33. The mirror 34 reflects the signal light, which has passed through the second reflecting surface 33*b* of the prism 33, so as to change the traveling direction of the signal light by 90° in the plane parallel to the main surface of the substrate 32. The third planar light diffraction element 31*a*3 and the fourth planar light diffraction element 31*a*4 are arranged side by side in a straight line on an optical path of the signal light that has been reflected by the mirror 34. Thus, the signal light that has been reflected by the mirror 34 passes through the third planar light diffraction element 31*a*3 and the fourth planar light diffraction element 31*a*4 in this order. As such, in the optical computing device 3, first optical computing by the first planar light diffraction element 31*a*1, third optical computing by the third planar light diffraction element 31*a*3, and fourth optical computing by the fourth planar light diffraction element 31*a*4 are carried out in this order.

(Effect of Optical Computing Device)

As described above, the optical computing device 3 includes the prism 33 and the mirror 34 each of which functions as an optical element that causes branching of the optical path of the signal light into a first optical path (OPTICAL PATH A in FIG. 4) and a second optical path (OPTICAL PATH B in FIG. 4). The light diffraction element group 31 includes the planar light diffraction element 31*a*2 that is provided on the first optical path and the planar light diffraction elements 31*a*3 and 31*a*4 that are provided on the second optical path.

Thus, the optical computing device 3 makes it possible to cause branching of one optical path into two optical paths A and B and carry out separate types of optical computing in the respective optical paths A and B. That is, the optical computing device 3 makes it possible to carry out a plurality of (two in Example 3) types of optical computing simultaneously.

Example 4

(Configuration of Optical Computing Device)

Figure 5:
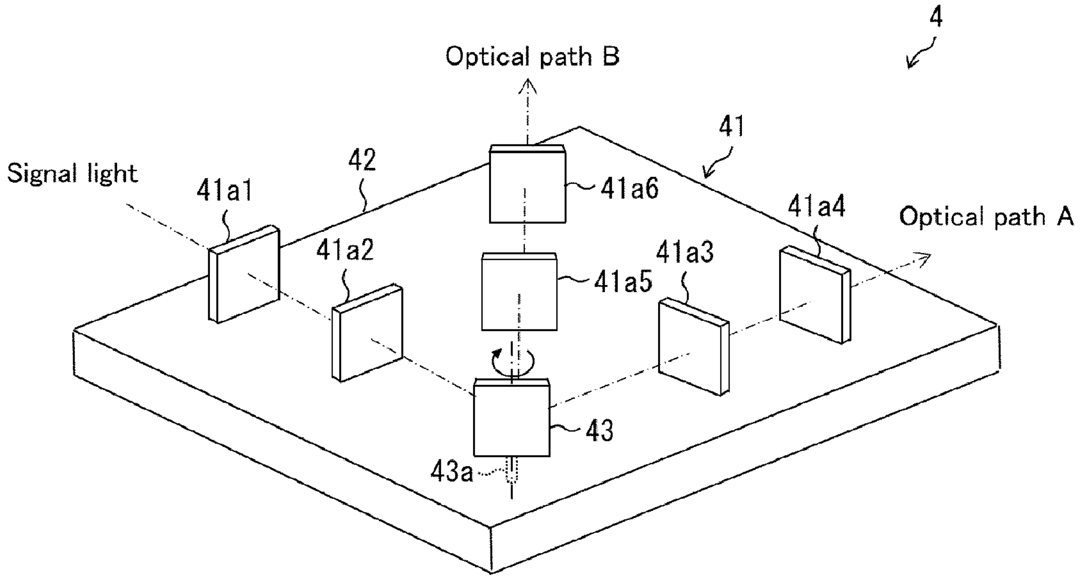
FIG. 5 is a perspective view illustrating a configuration of an optical computing device in accordance with Example 4.

The following description will discuss, with reference to FIG. 5, a configuration of an optical computing device 4 in accordance with Example 4. FIG. 5 is a perspective view illustrating a configuration of the optical computing device 4.

The optical computing device 4 includes a light diffraction element group 41, a substrate 42, and a mirror 43. The light diffraction element group 41 is constituted by a plurality of (six in Example 4) planar light diffraction elements 41*a*1 to 41*a*6. Example 4 employs, as the planar light diffraction elements 41*a*1 to 41*a*6, plate-like members each of which is made of a resin and has a square shape in a plan view. Furthermore, Example 4 uses, as the substrate 42, a plate-like member that is made of glass and has a rectangular shape in a plan view. Furthermore, in Example 4, the mirror 43 is rotatably configured with an axis orthogonal to a main surface of the substrate 42 serving as a rotation axis. FIG. 5 illustrates a configuration in which a cylindrical protrusion 43*a* that protrudes from an end surface of the mirror 43 is inserted into a cylindrical hole which is provided on an upper surface of the substrate 42, so that the mirror 43 is rotatably fixed to the substrate 42.

Each of the planar light diffraction elements 41*a*1 to 41*a*6 has an end surface which is directly fixed to the main surface of the substrate 42 so that an entrance surface thereof and an exit surface thereof intersect (in Example 4, are orthogonal to) the main surface of the substrate 42.

Each of planar light diffraction elements 41*ai* (i=1, 2, . . . , 6) is constituted by a plurality of microcells that have respective thicknesses or refractive indices set independently of each other. Upon entry of signal light into the optical computing device 4, signal light beams that have passed through the respective microcells and that have different phases mutually interfere with each other, so that predetermined optical computing is carried out. Since a specific example of each of the planar light diffraction elements 41*ai* is similar to the specific example of each of the planar light diffraction elements 11*ai* (i=1, 2, 3, 4) of the optical computing device 1 in accordance with Example 1, a description thereof is omitted here.

In Example 4, the first planar light diffraction element 41*a*1 and the second planar light diffraction element 41*a*2 are arranged side by side in a straight line on an optical path of signal light that is input to the optical computing device 4. Thus, the signal light that has been input to the optical computing device 4 passes through the first planar light diffraction element 41*a*1 and the second planar light diffraction element 41*a*2 in this order. The mirror 43 is provided on an optical path of the signal light that has passed through the second planar light diffraction element 41*a*2. The mirror 43 is capable of (i) orienting a reflecting surface thereof in a first direction and (ii) orienting the reflecting surface in a second direction.

In a case where the reflecting surface of the mirror 43 is oriented in the first direction, the third planar light diffraction element 41*a*3 and the fourth planar light diffraction element 41*a*4 are arranged side by side in a straight line on an optical path of the signal light that has been reflected by the mirror 43. Thus, the signal light that has been reflected by the mirror 43 passes through the third planar light diffraction element 41*a*3 and the fourth planar light diffraction element 41*a*4 in this order. As such, in this case, in the optical computing device 4, first optical computing by the first planar light diffraction element 41*a*1, second optical computing by the second planar light diffraction element 41*a*2, third optical computing by the third planar light diffraction element 41*a*3, and fourth optical computing by the fourth planar light diffraction element 41*a*4 are carried out in this order.

In a case where the reflecting surface of the mirror 43 is oriented in the second direction, the fifth planar light diffraction element 41*a*5 and the sixth planar light diffraction element 41*a*6 are arranged side by side in a straight line on an optical path of the signal light that has been reflected by the mirror 43. Thus, the signal light that has been reflected by the mirror 43 passes through the fifth planar light diffraction element 41*a*5 and the sixth planar light diffraction element 41*a*6 in this order. As such, in this case, in the optical computing device 4, the first optical computing by the first planar light diffraction element 41*a*1, the second optical computing by the second planar light diffraction element 41*a*2, fifth optical computing by the fifth planar light diffraction element 41*a*5, and sixth optical computing by the sixth planar light diffraction element 41*a*6 are carried out in this order.

(Effect of Optical Computing Device)

As described above, the optical computing device 4 includes the mirror 43 serving as an optical element which guides the optical path of the signal light to a first optical path (OPTICAL PATH A in FIG. 5) or a second optical path (OPTICAL PATH B in FIG. 5) and in which an optical path through which the signal light is guided is variable. The light diffraction element group 41 includes the planar light diffraction elements 41*a*3 and 41*a*4 that are provided on the first optical path and the planar light diffraction elements 41*a*5 and 41*a*6 that are provided on the second optical path.

Thus, the optical computing device 4 enables a user to select one of the optical paths A and B. As such, the optical computing device 4 makes it possible to carry out any of a plurality of (two in Example 4) types of optical computing and enables the user to select which type of optical computing to carry out.

Example 5

(Configuration of Optical Computing Device)

Figure 6:
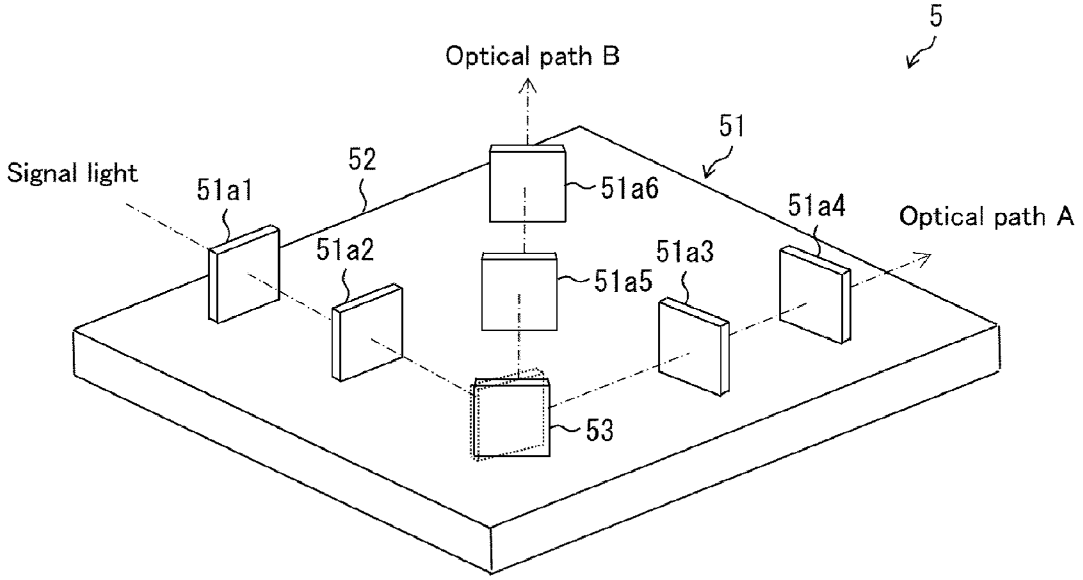
FIG. 6 is a perspective view illustrating a configuration of an optical computing device in accordance with Example 5.

The following description will discuss, with reference to FIG. 6, a configuration of an optical computing device 5 in accordance with Example 5. FIG. 6 is a perspective view illustrating a configuration of the optical computing device 5.

The optical computing device 5 includes a light diffraction element group 51, a substrate 52, and a mirror 53. The light diffraction element group 51 is constituted by a plurality of (six in Example 5) planar light diffraction elements 51*a*1 to 51*a*6. Example 5 employs, as the planar light diffraction elements 51*a*1 to 51*a*6, plate-like members each of which is made of a resin and has a square shape in a plan view. Furthermore, Example 5 uses, as the substrate 52, a plate-like member that is made of glass and has a rectangular shape in a plan view.

Each of the planar light diffraction elements 51*a*1 to 51*a*6 has an end surface which is directly fixed to a main surface of the substrate 52 so that an entrance surface thereof and an exit surface thereof intersect (in Example 5, are orthogonal to) the main surface of the substrate 52.

Each of planar light diffraction elements 51*ai* (i=1, 2, . . . , 6) is constituted by a plurality of microcells that have respective thicknesses or refractive indices set independently of each other. Upon entry of signal light into the optical computing device 5, signal light beams that have passed through the respective microcells and that have different phases mutually interfere with each other, so that predetermined optical computing is carried out. Since a specific example of each of the planar light diffraction elements 51*ai* is similar to the specific example of each of the planar light diffraction elements 11*ai* (i=1, 2, 3, 4) of the optical computing device 1 in accordance with Example 1, a description thereof is omitted here.

In Example 5, the first planar light diffraction element 51*a*1 and the second planar light diffraction element 51*a*2 are arranged side by side in a straight line on an optical path of signal light that is input to the optical computing device 5. Thus, the signal light that has been input to the optical computing device 5 passes through the first planar light diffraction element 51*a*1 and the second planar light diffraction element 51*a*2 in this order. The mirror 53 is provided on an optical path of the signal light that has passed through the second planar light diffraction element 51*a*2. The mirror 53 (1) can be fixed to the substrate 52 so that a reflecting surface thereof faces in a first direction, as indicated by the solid lines in FIG. 6, or (2) can be fixed to the substrate 52 so that the reflecting surface thereof faces in a second direction, as indicated by the dotted lines in FIG. 6.

In a case where the mirror 53 is fixed to the substrate 52 so that a reflecting surface thereof is oriented in the first direction, the third planar light diffraction element 51*a*3 and the fourth planar light diffraction element 51*a*4 are arranged side by side in a straight line on an optical path of the signal light that has been reflected by the mirror 53. Thus, the signal light that has been reflected by the mirror 53 passes through the third planar light diffraction element 51*a*3 and the fourth planar light diffraction element 51*a*4 in this order. As such, in this case, in the optical computing device 5, first optical computing by the first planar light diffraction element 51*a*1, second optical computing by the second planar light diffraction element 51*a*2, third optical computing by the third planar light diffraction element 51*a*3, and fourth optical computing by the fourth planar light diffraction element 51*a*4 are carried out in this order.

In a case where the mirror 53 is fixed to the substrate 52 so that the reflecting surface thereof is oriented in the second direction, the fifth planar light diffraction element 51*a*5 and the sixth planar light diffraction element 51*a*6 are arranged side by side in a straight line on an optical path of the signal light that has been reflected by the mirror 53. Thus, the signal light that has been reflected by the mirror 53 passes through the fifth planar light diffraction element 51*a*5 and the sixth planar light diffraction element 51*a*6 in this order. As such, in this case, in the optical computing device 5, the first optical computing by the first planar light diffraction element 51*a*1, the second optical computing by the second planar light diffraction element 51*a*2, fifth optical computing by the fifth planar light diffraction element 51*a*5, and sixth optical computing by the sixth planar light diffraction element 51*a*6 are carried out in this order.

(Effect of Optical Computing Device)

As described above, the optical computing device 5 includes the mirror 53 serving as an optical element which guides the optical path of the signal light to a first optical path (OPTICAL PATH A in FIG. 6) or a second optical path (OPTICAL PATH B in FIG. 6) and in which an optical path through which the signal light is guided is invariable. The light diffraction element group 51 includes the planar light diffraction elements 51*a*3 and 51*a*4 that are provided on the first optical path and the planar light diffraction elements 51*a*5 and 51*a*6 that are provided on the second optical path.

Thus, the optical computing device 5 enables a manufacturer to select one of the optical paths A and B. As such, the optical computing device 5 makes it possible to carry out any of a plurality of (two in Example 5) types of optical computing and enables the manufacturer to select which type of optical computing to carry out.

Example 6

(Configuration of Optical Computing Device)

Figure 7:
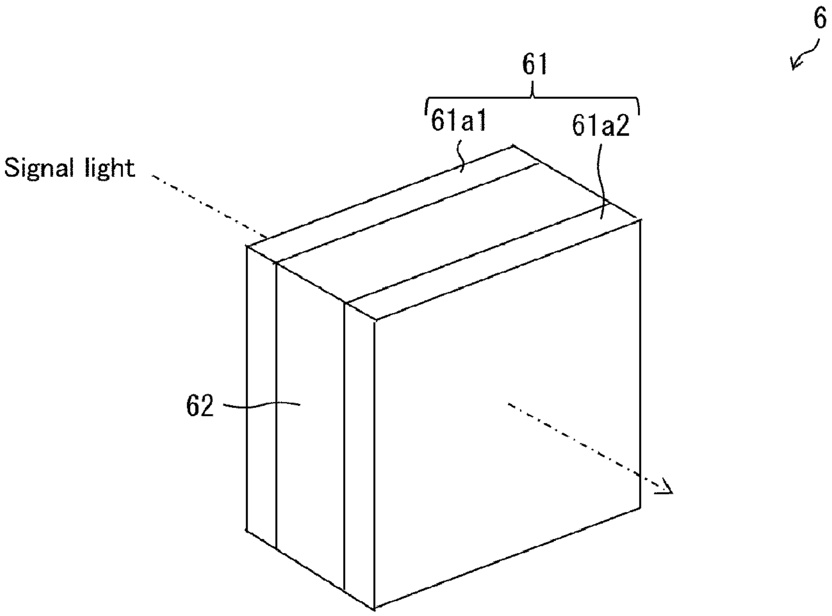
FIG. 7 is a perspective view illustrating a configuration of an optical computing device in accordance with Example 6.

The following description will discuss, with reference to FIG. 7, a configuration of an optical computing device 6 in accordance with Example 6. FIG. 7 is a perspective view illustrating a configuration of the optical computing device 6.

The optical computing device 6 includes a light diffraction element group 61 and a substrate 62. The light diffraction element group 61 is constituted by a plurality of (two in Example 6) planar light diffraction elements 61*a*1 and 61*a*2. Example 6 employs, as the planar light diffraction elements 61*a*1 and 61*a*2, plate-like members each of which is made of a resin and has a square shape in a plan view. Furthermore, Example 6 uses, as the substrate 62, a plate-like member that is made of glass and has a square shape in a plan view.

The first planar light diffraction element 61*a*1 is fixed to the substrate 62 so that an exit surface thereof is in surface contact with one of main surfaces of the substrate 62. In contrast, the second planar light diffraction element 61*a*2 is fixed to the substrate 62 so that an entrance surface thereof is in surface contact with the other of the main surfaces of the substrate 62.

Each of planar light diffraction elements 61*ai* (i=1, 2) is constituted by a plurality of microcells that have respective thicknesses or refractive indices set independently of each other. In a case where the microcells are constituted by pillars, pillars of the first planar light diffraction element 61*a*1 are provided, for example, on the entrance surface side of the first planar light diffraction element 61*a*1, and pillars of the second planar light diffraction element 61*a*2 are provided, for example, on the exit surface side of the second planar light diffraction element 61*a*2. Upon entry of signal light into the optical computing device 6, signal light beams that have passed through the respective microcells and that have different phases mutually interfere with each other, so that predetermined optical computing is carried out. Since a specific example of each of the planar light diffraction elements 61*ai* is similar to the specific example of each of the planar light diffraction elements 11*ai* (i=1, 2, 3, 4) of the optical computing device 1 in accordance with Example 1, a description thereof is omitted here.

In Example 6, the first planar light diffraction element 61*a*1 and the second planar light diffraction element 61*a*2 are arranged side by side in a straight line on an optical path of signal light that is input to the optical computing device 6. Thus, the signal light that has been input to the optical computing device 6 passes through the first planar light diffraction element 61*a*1 and the second planar light diffraction element 61*a*2 in this order. As such, in the optical computing device 6, first optical computing by the first planar light diffraction element 61*a*1 and second optical computing by the second planar light diffraction element 61*a*2 are carried out in this order.

(Effect of Optical Computing Device)

As described above, the optical computing device 6 includes the substrate 62 and the light diffraction element group 61 including the plurality of planar light diffraction elements 61*a*1 and 61*a*2. Each of the planar light diffraction elements 61*ai* belonging to the light diffraction element group 61 is constituted by a plurality of microcells that have respective thicknesses or refractive indices set independently of each other. The first planar light diffraction element 61*a*1 is fixed to the substrate 62 so that the exit surface thereof is in surface contact with one of the main surfaces of the substrate 62. The second planar light diffraction element 61*a*2 is fixed to the substrate 62 so that the entrance surface thereof is in surface contact with the other of the main surfaces of the substrate 62.

Thus, in the optical computing device 6, the entire exit surface or the entire entrance surface of each of the planar light diffraction elements 61*ai* is fixed to the substrate 62. Thus, such a configuration makes it less likely for strain or stress caused by a change in ambient temperature to occur in each of the planar light diffraction elements 61*ai*, as compared with a case where the technique disclosed in Patent Literature 1 is used to fix the entire outer periphery of each of the planar light diffraction elements 61*ai* to an inner surface of a tubular holder. This makes it possible to achieve the optical computing device 6 that easily maintains a computing function even in a case where ambient temperature changes.

(Variation of Optical Computing Device)

Figure 8:
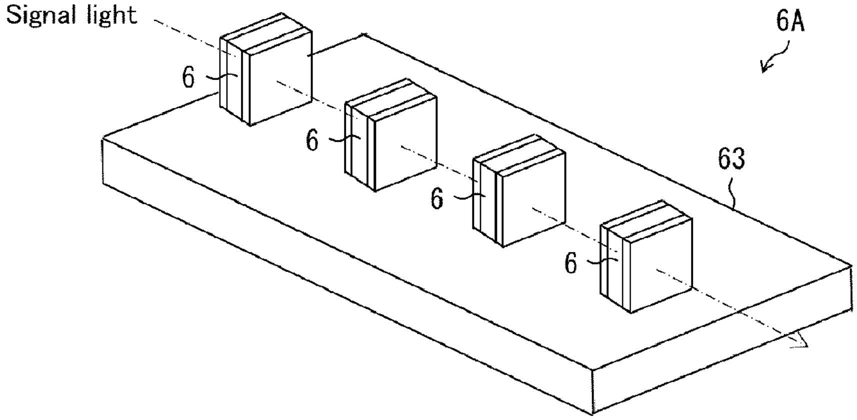
FIG. 8 is a perspective view illustrating a variation of the optical computing device in accordance with Example 6.

It is also possible to achieve an optical computing device that includes a plurality of optical computing devices 6. FIG. 8 is a perspective view illustrating a structure of such an optical computing device 6A.

The optical computing device 6A includes four optical computing devices 6 that are provided on a substrate 63. In the optical computing device 6A, each of the optical computing devices 6 is configured such that an end surface of the substrate 62 is directly fixed to a main surface of the substrate 63 so that a main surface of the substrate 62 intersects (in Example 6, is orthogonal to) the main surface of the substrate 63. As described earlier, it is easy for each of the optical computing devices 6 to maintain a computing function even in a case where ambient temperature changes. This consequently makes it easy also for the optical computing device 6A, which is a collection of the optical computing devices 6, to maintain the computing function even in a case where ambient temperature changes.

Embodiments of the present invention can also be expressed as follows:

An optical computing device in accordance with one or more embodiments includes: a substrate; and a light diffraction element group including a plurality of planar light diffraction elements, each planar light diffraction element belonging to the light diffraction element group (i) being constituted by a plurality of microcells that have respective thicknesses or refractive indices set independently of each other and (ii) being fixed to the substrate.

In addition to the configuration of the optical computing device described earlier, an optical computing device in accordance with one or more embodiments is configured such that the each planar light diffraction element belonging to the light diffraction element group is fixed to the substrate so that an entrance surface thereof and an exit surface thereof intersect a main surface of the substrate.

An optical computing device in accordance with one or more embodiments employs, in addition to the configuration of the optical computing device in accordance with the second aspect described earlier, a configuration to further include an optical element that folds back an optical path of signal light in a plane which intersects the main surface of the substrate, the light diffraction element group including (i) a planar light diffraction element that is provided on one of the optical path which has not been folded back and the optical path which has been folded back and that is directly fixed to the substrate and (ii) a planar light diffraction element that is provided on the other of the optical path which has not been folded back and the optical path which has been folded back and that is indirectly fixed to the substrate via the planar light diffraction element which is directly fixed to the substrate.

An optical computing device in accordance with one or more embodiments employs, in addition to the configuration of the optical computing device in accordance with the second aspect described earlier, a configuration such that the light diffraction element group includes (i) a planar light diffraction element that is provided on a first optical path and (ii) a planar light diffraction element that is provided on a second optical path which is different from the first optical path.

An optical computing device in accordance with one or more embodiments employs, in addition to the configuration of the optical computing device in accordance with the fourth aspect described earlier, a configuration to further include an optical element that causes branching of an optical path of signal light into the first optical path and the second optical path.

An optical computing device in accordance with one or more embodiments employs, in addition to the configuration of the optical computing device in accordance with the fourth aspect described earlier, a configuration to further include an optical element which guides signal light to the first optical path or the second optical path and in which an optical path of the signal light is variable.

An optical computing device in accordance with one or more embodiments employs, in addition to the configuration of the optical computing device in accordance with the fourth aspect described earlier, a configuration to further include an optical element which guides signal light to the first optical path or the second optical path and in which an optical path of the signal light is invariable.

An optical computing device in accordance with one or more embodiments employs, in addition to the configuration of the optical computing device in accordance with any one of the first through seventh aspects described earlier, a configuration to further include a cover that faces the substrate and that is supported so as to be in non-contact with the each planar light diffraction element belonging to the light diffraction element group.

In addition to the configuration of the optical computing device described earlier, an optical computing device in accordance with one or more embodiments is configured such that the light diffraction element group includes (i) a first planar light diffraction element that is fixed to the substrate so that an exit surface thereof is in surface contact with one of main surfaces of the substrate and (ii) a second planar light diffraction element that is fixed to the substrate so that an entrance surface thereof is in surface contact with the other of the main surfaces of the substrate.

An optical computing device in accordance with one or more embodiments employs, in addition to the configuration of the optical computing device in accordance with any one of the first through ninth aspects described earlier, a configuration such that the light diffraction element group includes a planar light diffraction element both surfaces of which are each provided with a plurality of pillars that have respective heights set independently of each other.

A method for manufacturing an optical computing device in accordance with one or more embodiments is a method for manufacturing an optical computing device in accordance with any one of the first through tenth aspects described earlier, including the step of collectively forming planar light diffraction elements belonging to the light diffraction element group.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1, 2, 3, 4, 5, 6, 6A Optical computing device
11, 21, 31, 41, 51, 61 Light diffraction element group
11*ai*, 21*ai*, 31*ai*, 41*ai*, 51*ai*, 61*ai* Planar light diffraction element
12, 22, 32, 42, 52, 62, 63 Substrate
23, 33 Prism (optical element)
34, 43, 53 Mirror (optical element)
15 Cover

The invention claimed is:

1. An optical computing device comprising:

a substrate; and planar light diffraction elements, wherein each of the planar light diffraction elements is fixed to the substrate and includes microcells that have respective thicknesses or refractive indices set independently, each of the planar light diffraction elements is fixed to the substrate such that an entrance surface of each of the planar light diffraction elements and an exit surface of each of the planar light diffraction elements intersect a main surface of the substrate, the optical computing device further comprises an optical element that folds back an optical path of signal light in a plane which intersects the main surface of the substrate, and the planar light diffraction elements include:

a planar light diffraction element directly fixed to the substrate and disposed on one of the optical path which has not been folded back and the optical path which has been folded back; and a planar light diffraction element indirectly fixed to the substrate via the directly fixed planar light diffraction element and disposed on the other of the optical path which has not been folded back and the optical path which has been folded back.

2. The optical computing device as set forth in claim 1, further comprising:

a cover that faces the substrate and does not contact the planar light diffraction elements.

3. A method for manufacturing the optical computing device as set forth in claim 1, comprising:

collectively forming the planar light diffraction elements.

4. The optical computing device as set forth in claim 1, wherein the microcells are constituted by pillars disposed on both sides of a base.

* * * * *